United States Patent [19]

Tomita

[11] Patent Number: 5,339,371
[45] Date of Patent: Aug. 16, 1994

[54] OPTICAL INTERCONNECTION NETWORKS AND PROCESSES

[75] Inventor: Yasuo Tomita, Yokohama, Japan

[73] Assignee: Canon Kabushiki Kaisha, Tokyo, Japan

[21] Appl. No.: 831,986

[22] Filed: Feb. 6, 1992

[30] Foreign Application Priority Data

Feb. 8, 1991 [JP] Japan .................................. 3-039482

[51] Int. Cl.⁵ .................................................. G02B 6/26
[52] U.S. Cl. ...................................... 385/24; 359/300
[58] Field of Search ................. 359/300, 838, 7, 109; 385/24, 37, 33, 27

[56] References Cited

U.S. PATENT DOCUMENTS 4,913,534  4/1990  Lafleur et al. ....................... 359/300
4,953,954  9/1990  Ewbank et al. ..................... 359/109

OTHER PUBLICATIONS

Kitayama, et al., "Architectural Consideration for Optical Self-Routing Interconnection Networks," Third Optical Communication Systems Symposium Material, Electronics Information Communication Society pp. 27-34 1989.
Weiss, et al., "Photorefractive Dynamic Optical Interconnects," Applied Optics, vol. 27, No. 16, Aug. 1988, pp. 3422 through 3428.
Tomita, et al., "Polarization and Spatial Information Recovery by Modal Dispersal and Phase Conjugation: Properties and Application," IEEE Journal of Quantum Electronics, vol. 25, No. 3, Mar. 1989, pp. 315-338.
Fischer, et al., "Photorefractive Oscillators," IEEE Journal of Quantum Electronics, vol. 25, No. 3, Mar. 1989, pp. 550 through 569.
Kitayama, "Optical Computing and Photorefractive Crystals," Applied Physics Society, Crystal Engineering Section Meeting, Jan. 1991, pp. 13 through 17, with English translation, pp. 1 through 10.

*Primary Examiner*—Rodney B. Bovernick
*Assistant Examiner*—John Ngo
*Attorney, Agent, or Firm*—Fitzpatrick, Cella, Harper & Scinto

[57] ABSTRACT

Disclosed are an optical interconnection network and process, having a phase-conjugate mirror and input and output side channels. In the network, time-reversed wave, of a light beam propagated through the output side channel, is generated in the phase-conjugate mirror to cause an interconnection between the input side channel and the output side channel. The energy of the time-reversed wave comes from a light beam propagated through the input side channel.

12 Claims, 3 Drawing Sheets

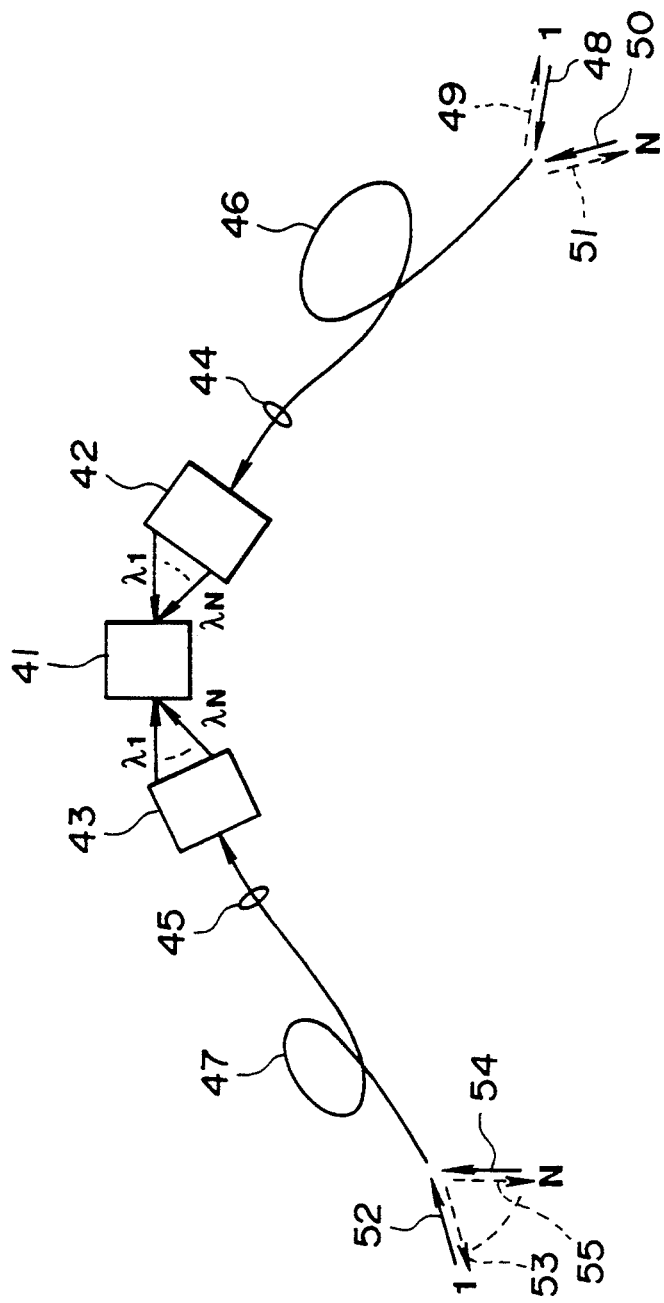

OPTICAL INTERCONNECTION NETWORKS AND PROCESSES

BACKGROUND OF THE INVENTION

1. Field of the Invention

The present invention relates to optical interconnection networks or optical crossbar switches and processes using a purely optical means for performing the switching of a signal between an input and output. The switching involves not only that of a one-to-one connection type between any selected input and output, but also those of a one-to-multiple connection or broadcasting type and a multiple-to-one connection type.

2. Related Background Art

Conventionally, an electric crossbar switch has been used as an interconnection means between the input and the output of a non-closed type information network. In the electric crossbar switch, however, the number of electric switches increases in proportion to the product of the number of input and output terminals. As a result, problems such as a shortage of transmission bands, the physical complexity of the system, the large size of the system, and similar problems are more likely to occur as the scale of the system becomes larger. Hence, it was difficult to make the scale of the system large.

SUMMARY OF THE INVENTION

An object of the present invention is to provide an optical interconnection network and process thereof in which a crossbar switch is achieved by a purely optical means. This is achieved by utilizing the characteristics of light such as high parallelism, non-induction, high speed and broad band. As a result, the problems of the electric crossbar switch system can be eliminated.

The invention is directed to an optical interconnection network and a process thereof in which a phase-conjugate mirror and input and output side channels are arranged. A time-reversed wave of a light beam propagating through the output side channel is generated in the phase-conjugate mirror to cause an interconnection between the input side channel and the output side channel. The energy of the time-reversed wave comes from a light beam propagated through the input side channel.

According to one aspect of an interconnection network of the present invention, there are provided a phase-conjugate mirror that receives light beams propagating through the network, at least one channel at an input side of the network and at least one channel at an output side of the network. An incident or incoming light beam is propagated through the input side channel to enter the phase-conjugate mirror, while a light beam is always propagated through the output side channel to enter the phase-conjugate mirror. The input and output side channels are arranged such that wavelengths of the lights propagated through the input and output side channels are set in a predetermined relationship to perform a self-routing function in which the output side channel that is to be connected to the input side channel is designated by the incoming light itself.

In more detail, there are further provided a first multimode optical fiber and a first wavelength dispersal element. The light propagated through the input side channel, to enter the phase-conjugate mirror, passes through the first multimode optical fiber and the first wavelength dispersal element. There are further provided a second multimode optical fiber and a second wavelength dispersal element. The light propagated through the output side channel, to enter the phase-conjugate mirror, passes through the second multimode optical fiber and the second wavelength dispersal element. In one embodiment of the present invention, the phase-conjugate mirror comprises a double phase-conjugate mirror. Further, the phase-conjugate mirror comprises an electro-optic crystal having a photorefractive effect. The light beams propagated through the output side channels always enter the phase-conjugate mirror with predetermined different wavelengths and the light propagated through the input side channel designates one of the output side channels by causing the wavelength of the light propagated through said input side channel to coincide with that of the light beam propagated through the output side channel that is to be connected with the input side channel.

In another embodiment, the optical interconnection process has a phase-conjugate mirror for receiving propagating light beams. The process causes an incoming light beam to propagate through an input side channel and be incident on the phase-conjugate mirror. The optical interconnection process generates in the phase-conjugate mirror a time-reversed wave corresponding to the light beam propagated through the output side channel. This causes an interconnection between the input side channel and the output side channel, where the energy of the time-reversed wave is derived from the incoming light beam being propagated through the input side channel.

These advantages and others will be more readily understood in connection with the following detailed description of the preferred embodiment in conjunction with the drawings.

BRIEF DESCRIPTION OF THE DRAWINGS

FIG. 4 is a schematic view of an embodiment of the present invention.

DESCRIPTION OF THE PREFERRED EMBODIMENT

Figure 1A:
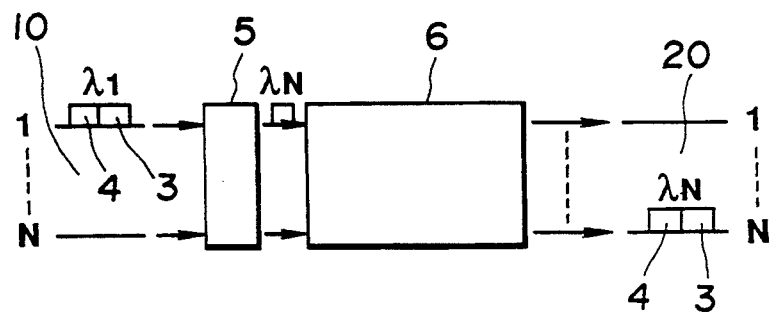
FIGS. 1a–d are drawings for explaining a crossbar switching device having a function of self-routing.
Figure 1B:
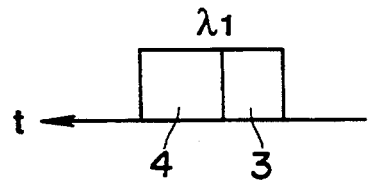
Figure 1C:
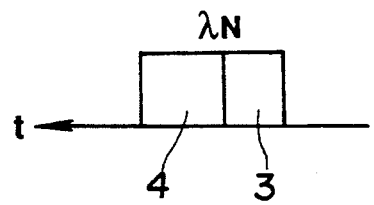
Figure 1D:
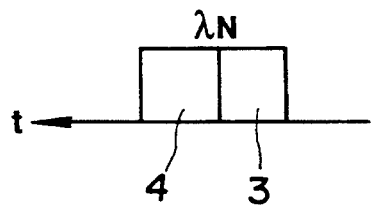

Initially, the principle of the present invention will be described referring to an example of FIG. 1. In FIG. 1a, an input side 10 includes channel 1 through channel N, where the wavelength of an input signal in one channel is selected from one of wavelengths $\lambda_1 \sim \lambda_N$. Thus, the self-routing function is achieved in such a manner that the input signals of the respective input side channels $1 \sim N$ designate their addresses or output side channels $1 \sim N$ by themselves, respectively. At an output side 20, there are arranged channels $1 \sim N$ corresponding to the wavelengths used at the input side 10. The wavelengths $\lambda_i \sim \lambda_N$ at the input side respectively correspond to the channels $1 \sim N$ at the output side 20. Thereby, an interconnection or crossbar switch having an N×N self-routing function can be attained. An optical signal of one wavelength has, for example, a wavelength of $\lambda_1$ when the signal enters a switching system. The optical signal includes, as shown in FIGS. 1a–1b, two cells, i.e., a control information or data field 3 containing an address data at the crossbar switch 6 and an information or data field 4. FIG. 1b shows the optical signal prior to pre-processing, FIG. 1c shows the signal after pre-processing and FIG. 1d shows the signal after crossbar switching. The control data field 3 of the signal is read in a pre-processing part 5, and the wavelength of the signal is converted into a wavelength (for example, a wavelength of $\lambda_N$) corresponding to the address data (output side channel) at the crossbar switch. At this time, the control data field 3 containing an address information at a next switching system and the original information field 4 are modulated in the wavelength $\lambda_N$. In an embodiment described below, an explanation is begun with a stage after the pre-processing part 5. Therefore, after the signal passes the crossbar switch 6, the optical signal of the control information field 3 and the information field 4 are modulated, as shown in FIG. 1c, in the wavelength $\lambda_N$ and enter the next switching system. In connection with this, see Kitayama et al., "Third Optical Communication Systems Symposium Material, OCS 89-1S~11S (1989)", Optical Communication System Special Study Committee (Electronics Information Communication Society).

Next, the principle will be described, by which the crossbar switching between input and output is performed in a purely optical manner, and how a self-routing control for conducting the switch control by an input signal itself is achieved. Such a structure using a DPCM and a multimode optical fiber is utilized for explaining this principle.

Figure 2:
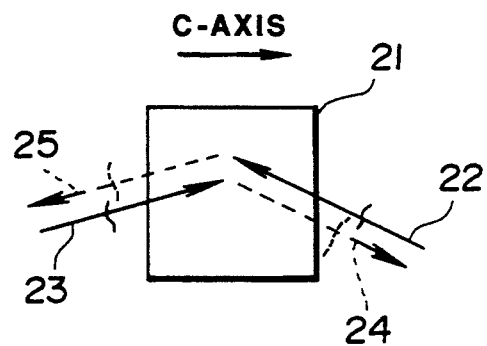
FIG. 2 is a drawing for explaining the principle of a double phase-conjugate mirror (DPCM).

FIG. 2 shows the DPCM. In FIG. 2, an electro-optic crystal 21 has a photorefractive effect (PR effect). The PR effect is a phenomenon that a space-charged electric field distribution is generated in a crystal 21 by light irradiating thereinto, causing a change in the refractive index of the crystal 21, due to a linear electro-optic effect (Pockels effect). As an example of such a crystal, there are ferroelectric electro-optic crystals such as barium titanate ($BaTiO_3$) and semiconductor electro-optic crystals such as GaAs. Here, $BaTiO_3$ is used as an example. In FIG. 2, when a c-axis of the barium titanate crystal 21 is oriented in an appropriate direction as shown in FIG. 2, an incoming light 22 is scattered in the crystal 21 and the scattered light and the incoming light 22 interact with each other to form a multiplicity of refractive index gratings in the crystal 21. In this case, an exchange of energy is conducted between the scattered light and the incoming light 22 due to a nonlinear interaction causing an energy transfer from the incoming light 22 to the scattered light. This is called a two-wave mixing.

On the other hand, when another incoming light 23 enters the crystal 21 from the left side of FIG. 2, additional refractive index gratings are formed in the crystal 21 due to the interaction between the incoming light 23 and its scattered light causing an energy transfer from the incoming light 23 to its scattered light. During such a process, a common refractive index grating of a group of the refractive index gratings formed by the incoming lights 22 and 23 and the respective scattered lights diffracts the respective incoming lights 22 and 23 to cause an induced scattering which strengthens the common refractive index grating. As a result, only the common refractive index grating survives in a steady state. It should be noted that the incoming lights 22 and 23 do not need to be coherent with each other since the refractive index gratings are formed by the incoming light 22 and its scattered light 25 and by the incoming light 23 and its scattered light 24.

Therefore, when the incoming lights 22 and 23 exist in the crystal 21 at the same time, the scattered lights 24 and 25 become phase-conjugated waves of the incoming lights 22 and 23, respectively, even if the incoming lights 22 and 23 are incoherent with each other. Further, a remarkable feature exists in that energies of those phase-conjugated waves 24 and 25 come from the incoming lights 23 and 22, respectively (not 22 and 23). That is, the phase-conjugated waves 24 and 25 are diffraction lights of the incoming lights 23 and 22, respectively, that are diffracted by the above-discussed refractive index grating. In more detail, the phase-conjugated wave 24 receives its energy and bias phase component from the incoming light 23 while being a round-trip (time-reversed) wave of the incoming light 22, and the phase-conjugated wave 25 receives its energy and bias phase component from the incoming light 22 while being a round-trip (time-reversed) wave of the incoming light 23. With respect to theoretical and experimental details thereof, see B. Fischer et al., "IEEE J. Quantum Electron. QE-25, 550–569 (1989)".

Figure 3:
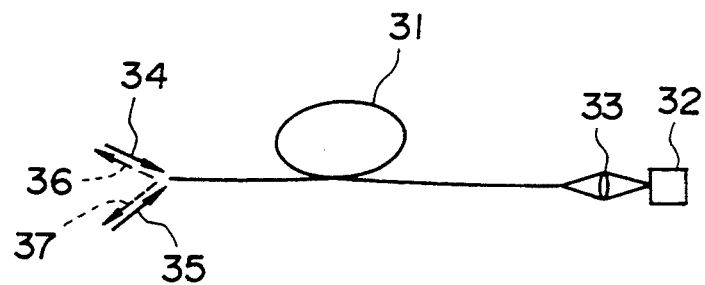
FIG. 3 is a schematic view for explaining the propagation of a phase-conjugated wave in a multimode optical fiber.

FIG. 3 shows the characteristics of a phase-conjugated wave propagated through a multimode optical fiber. An arrangement in which a light beam propagated through a multimode optical fiber 31 enters a phase conjugate mirror (PCM) 32 through a lens 33 is now considered. Assuming that two incoming lights 34 and 35 enter the multimode optical fiber 31 at different angles, a light beam emerging from the multimode optical fiber 31 will be in a speckled state and its polarization state will be disturbed because modal dispersal and intermodal scrambling or scattering occur in the multimode optical fiber 31. In this case, however, when the phase conjugate mirror 32 produces a complete phase-conjugate wave for the light emerging from the right side end of the fiber 31 (including its polarization state), a reflection light from the PCM 32 propagates from right to left through a path identical with a propagation path from left to right since the reflection light is a time-reversed wave for the incoming light. The reflection light then emerges from the left end of the fiber 31 at the same angle as the incident angle of the incoming light. That is, reflection lights 36 and 37 are respectively phase-conjugate waves of the incoming lights 34 and 35, not only spatially, but also in the polarization state.

When a PR crystal is used as the PCM 32, the PCM 32 in FIG. 3 produces a phase-conjugate wave solely for a given polarization component of the emerging light from the right end of the fiber 31 since the PR effect is caused only for the given polarization component of the incoming light. However, when a numerical aperture (N.A.) of each incoming light 34, 35 into the fiber 31 is sufficiently smaller than the N.A. of the fiber 31, and the intermode scrambling or scattering is thoroughly generated in the fiber 31, the emerging lights 36 and 37 emerge from the fiber 31 as phase-conjugate waves, respectively, preserving the polarization states of the incoming lights 34 and 35. This fact is confirmed theoretically and experimentally. In this connection, see Y. Tomita et al., "IEEE J. Quantum Electron. QE-25, 315–338 (1989)". Therefore, under the above conditions, the reflection lights 36 and 37 become phase-conjugate waves of the incoming lights 34 and 35, respectively, both spatially and in the polarization state.

Based on the above-discussed principle, the optical interconnection or crossbar switching between input and output is performed in a purely optical manner, using the function of the PCM. Further, the self-routing control in which the switching control is performed by the input light signal itself is achieved by controlling its wavelength. According to the principle explained referring to FIG. 3, a connected response signal from the output side can reach the input side at the same time as that at which the connection between the input and output sides is completed. As a result, it is possible to confirm whether the connection between the input side and the output side is proper or not, in real time at the input side.

FIG. 4 shows an embodiment of the present invention. The DPCM shown in FIG. 2 is used as a phase-conjugate mirror 41. The above-mentioned PR crystal may preferably be used as a nonlinear optical crystal, but other materials may be used only if they can function as the DPCM. At both sides of the PCM 41, multimode optical fibers 46 and 47 are respectively connected through wavelength dispersal elements 42 and 43. A diffraction grating or the like is used as the wavelength dispersal element. It is assumed here that a light beam 52 corresponding to a channel 1 enters the left end of the multimode optical fiber 47 as an amplitude-modulated or phase-modulated light signal. The light beam is emitted from a single tunable laser or one of a plurality of tunable lasers.

When the wavelength of the light beam 52 is set to, for example, $\lambda_N$ (in this connection, see the explanation of FIG. 1), the light beam 52 enters the wavelength dispersal element 43 after passing through the multimode optical fiber 47 and a lens 45. Here, the wavelength dispersal element 43 is adjusted such that light beams respectively enter the PCM 41 at spatially different angles depending upon wavelengths of the light beams. In the assumed case, the light beam 52 of the channel 1 enters the PCM 41 at an angle corresponding to the wavelength $\lambda_N$.

On the other hand, light beams 48 and 50 enter the right end of the multimode optical fiber 46 at different incident angles corresponding to wavelengths $\lambda_1 \sim \lambda_N$. The light beams 48 and 50 having the wavelengths $\lambda_1 \sim \lambda_N$ correspond to output channels $1 \sim N$, respectively. The incident light beams 48 and 50 at the output channel side always enter the right end of the multimode optical fiber 46 whether light beams 52 and 54 of the input channels $1 \sim N$ enter the fiber 47 or not. In this structure, if the incoming beam 52 of the wavelength $\lambda_N$ enters the PCM 41, two light beams of the wavelength $\lambda_N$ (one is the light beam 52 and the other is the light beam 50) form a common refractive index grating due to the induced scattering based on the above-discussed principle. As a result, phase-conjugated waves of the light beams 50 and 52 are generated in the PCM 41. Consequently, the amplitude-modulated or phase-modulated light signal from the incident light beam 52 is automatically coupled to the multimode optical fiber 46 at an efficiency of 100% (excluding a Fresnel reflection) as a phase-conjugated wave of the incident light beam 50, after passing through the wavelength dispersal element 42 and a lens 44. The phase-conjugated wave then propagates through the multimode optical fiber 46 as a time-reversed wave of the incident light beam 50 and emerges from the channel N as a light beam 51. Similarly, the amplitude-modulated or phase-modulated light signal from the incident light beam 50 at the output side, which is generated in the PCM 41 as a phase-conjugated wave of the incident light beam 52, is automatically coupled to the multimode optical fiber 47 at an efficiency of 100% (excluding a Fresnel reflection) after passing through the wavelength dispersal element 43 and the lens 45. The phase-conjugated wave then propagates through the multimode optical fiber 47 as a time-reversed wave of the incident light beam 52 and emerges from the channel 1 as a light beam 53.

In such a process, a light signal from the incident light beam 52 (channel 1) as an input can be connected to the emerging light beam 51 (channel N) as an output through the multimode optical fibers 47 and 46. Moreover, the connected channel can be confirmed at the same time as that at which such connection is completed (i.e., simultaneously with this connection) because the emerging light beam 53 of the wavelength $\lambda_N$ can be detected at the input side. Thus, a set wavelength of each incident light beam at the input side can be selected from a group of $\lambda_1 \sim \lambda_N$, and therefore, the optical interconnection network having the self-routing function of $N \times N$ can be realized.

As explained in the foregoing, according to the present invention, a DPCM, for example, is used as a phase-conjugate mirror, and light beams are caused to be incident on the phase-conjugate mirror from both the input and output sides through, for example, a wavelength dispersal element and a multimode optical fiber. Thus, the crossbar switching between the input and the output is realized in a purely optical manner. Further, the self-routing is achieved by designating the output channel using the wavelength of the light beam from the input side. Moreover, the confirmation of the connection of the input channel to the output side is possible at the input side in real time, at the same time as that at which the connection between the input and the output is completed.

Except as otherwise disclosed herein, the various components shown in outline or in block form in FIGS. 1a–1d, 2, 3 and 4, are individually well-known and their internal construction and operation is not critical either to the making or using of this invention or to a description of the best mode of the invention.

While the present invention has been described with respect to what is presently considered to be the preferred embodiment, it is to be understood that the invention is not limited to the disclosed embodiment. The present invention is intended to cover various modifications and equivalent arrangements included within the spirit and scope of the appended claims.

What is claimed is:

1. An optical interconnection network comprising:
    a phase-conjugate mirror for receiving light beams propagating through said network;
    at least one channel at an input side of said network, an incoming light beam being propagated through said input side channel to enter said phase-conjugate mirror; and
    at least one channel at an output side of said network, a light beam always being propagated through said output side channel to enter said phase-conjugate mirror,
    wherein each of said input and output side channels is arranged such that light beams of different wavelengths enter a respective channel at different predetermined angles to perform a self-routing function.

2. An optical interconnection network according to claim 1, further comprising an input multimode optical fiber and an input wavelength dispersal element, wherein the light beam propagating through said input side channel passes through said input multimode optical fiber and said input wavelength dispersal element to enter said phase-conjugate mirror.

3. An optical interconnection network according to claim 1, further comprising an output multimode optical fiber and an output wavelength dispersal element, wherein the light beam propagating through said output side channel passes through said output multimode optical fiber and said output wavelength dispersal element to enter said phase-conjugate mirror.

4. An optical interconnection network according to claim 1, wherein said phase-conjugate mirror comprises a double phase-conjugate mirror.

5. An optical interconnection network according to claim 1, wherein said phase-conjugate mirror comprises an electro-optic crystal having a photorefractive effect.

6. An optical interconnection network according to claim 1, wherein the light beams propagating through said output side channel always enter said phase-conjugate mirror with predetermined different wavelengths and the incoming light beam propagating through said input side channel designates one of said output side channels by having a wavelength that coincides with that of the light beam propagating through said output side channel.

7. An optical interconnection network comprising:
a phase-conjugate mirror for receiving light beams propagating through said network;
a channel at an input side of said network being coupled to said phase-conjugate mirror, an incoming light beam being propagated through said input side channel to enter said phase-conjugate mirror;
a channel at an output side of said network being coupled to said phase-conjugate mirror, a light beam always being propagated through said output side channel to enter said phase-conjugate mirror; and
an input wavelength dispersal element, wherein the light beam propagating through said input side channel passes through said input wavelength dispersal element to enter said phase-conjugate mirror,
wherein said phase-conjugate mirror generates a time-reversed wave of the light beam being propagated through said output side channel to cause an interconnection between said input side channel and said output side channel, and wherein energy of the time-reversed wave is received from the incoming light propagating through said input side channel.

8. An optical interconnection network according to claim 7, wherein said phase-conjugate mirror generates a time-reversed wave of the incoming light beam propagating through said input side channel, and wherein energy of the time-reversed wave is received from the light beam propagating through said output side channel.

9. An optical interconnection network according to claim 7, further comprising an output wavelength dispersal element, wherein the light beam propagating through said output side channel passes through said output wavelength dispersal element to enter said phase-conjugate mirror.

10. An optical interconnection process comprising the steps of:
providing a phase-conjugate mirror for receiving propagating light beams;
causing an incoming light beam to propagate through an input side channel and be incident on the phase-conjugate mirror;
causing a light beam, which propagates through said input side channel, to pass through an input wavelength dispersal element and to enter the phase-conjugate mirror;
causing a light beam to always propagate through an output side channel and be incident on the phase-conjugate mirror; and
generating a time-reversed wave of the light beam propagated through the output side channel in the phase-conjugate mirror to cause an interconnection between the input side channel and the output side channel, wherein energy of the time-reversed wave is received from the incoming light beam being propagated through the input side channel.

11. An optical interconnection process according to claim 10, further comprising generating a time-reversed wave of the incoming light beam being propagated through the input side channel in the phase-conjugate mirror, wherein energy of the time-reversed wave is received from the light beam being propagated through the output side channel.

12. An optical interconnection process comprising the steps of:
providing a phase-conjugate mirror for receiving propagating light beams;
providing an input channel and an output channel at an input side and an output side of the phase-conjugate mirror, respectively;
inputting an incoming light beam to the input channel at a predetermined angle selected in accordance with a wavelength of the incoming light beam, so that the incoming light beam propagates through the input channel and is incident on the phase-conjugate mirror;
inputting a second light beam to the output channel at a predetermined angle selected in accordance with a wavelength of the second light beam, so that the second light beam propagates through the output channel and is incident on the phase-conjugate mirror; and
generating in the phase-conjugate mirror a time-reversed wave of the second light beam having energy received from the incoming light beam, to cause an interconnection between the input and output channels.

* * * * *